US009711764B2

(12) United States Patent
Mochizuki et al.

(10) Patent No.: US 9,711,764 B2
(45) Date of Patent: Jul. 18, 2017

(54) ELECTRIC STORAGE APPARATUS

(71) Applicant: GS Yuasa International Ltd., Kyoto-shi (JP)

(72) Inventors: Ryota Mochizuki, Kyoto (JP); Masao Kawata, Wako (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/602,156

(22) Filed: Jan. 21, 2015

(65) Prior Publication Data

US 2015/0207116 A1 Jul. 23, 2015

(30) Foreign Application Priority Data

Jan. 22, 2014 (JP) ................................. 2014-009896

(51) Int. Cl.
*H01M 2/10* (2006.01)
*H01M 2/20* (2006.01)

(52) U.S. Cl.
CPC ....... *H01M 2/1016* (2013.01); *H01M 2/1022* (2013.01); *H01M 2/1072* (2013.01); *H01M 2/1077* (2013.01); *H01M 2/202* (2013.01); *H01M 2/204* (2013.01); *H01M 2/206* (2013.01)

(58) Field of Classification Search
None
See application file for complete search history.

(56) References Cited

U.S. PATENT DOCUMENTS

| 2003/0162091 | A1 | 8/2003 | Watanabe et al. |
| 2005/0130033 | A1* | 6/2005 | Iwamura ............ H01M 2/0245 429/159 |
| 2007/0190409 | A1* | 8/2007 | Sakurai .................. H01G 2/04 429/159 |

(Continued)

FOREIGN PATENT DOCUMENTS

| JP | 2003-257391 A | 9/2003 |
| JP | 2009-277471 A | 11/2009 |

(Continued)

OTHER PUBLICATIONS

Daitoku et al. Battery assembly and method of manufacturing the same, JP2012-113898, Jun. 14, 2012.*

*Primary Examiner* — Patrick Ryan
*Assistant Examiner* — Christopher Domone
(74) *Attorney, Agent, or Firm* — McGinn IP Law Group, PLLC

(57) ABSTRACT

An electric storage apparatus of the present invention includes: a plurality of electric storage devices aligned in a first direction; and a frame configured to hold the plurality of electric storage devices, the frame including: a first frame element that is arranged so as to face the plurality of electric storage devices from one side in a second direction orthogonal to the first direction and to directly or indirectly abut the plurality of electric storage devices; and a second frame element that is arranged so as to face the plurality of electric storage devices from the other side in the second direction, wherein the second frame element includes, between the second frame element and the plurality of electric storage devices, a holding part having projections that are respectively in contact with the plurality of electric storage devices.

20 Claims, 12 Drawing Sheets

(56) References Cited

U.S. PATENT DOCUMENTS

| | | | |
|---|---|---|---|
| 2010/0021802 A1* | 1/2010 | Yang | H01M 2/0212 |
| | | | 429/91 |
| 2010/0190050 A1 | 7/2010 | Ochi | |
| 2011/0024207 A1* | 2/2011 | Higashino | H01M 2/0245 |
| | | | 180/65.1 |
| 2014/0023893 A1 | 1/2014 | Shimizu et al. | |

FOREIGN PATENT DOCUMENTS

| | | | |
|---|---|---|---|
| JP | 2010-176997 A | | 8/2010 |
| JP | 2011-023302 A | | 2/2011 |
| JP | 2012-113898 A | | 6/2012 |
| JP | 2012113898 | * | 6/2012 |
| JP | 2012-248482 A | | 12/2012 |

* cited by examiner

ELECTRIC STORAGE APPARATUS

CROSS-REFERENCE TO RELATED APPLICATION

This application claims priority to Japanese Patent Application No. 2014-009896, the disclosure of which is incorporated herein by reference in its entirety.

FIELD

The present invention relates to an electric storage apparatus including a plurality of electric storage devices.

BACKGROUND

Conventionally, electric storage apparatuses are provided as power sources of various equipment. Such an electric storage apparatus includes: a plurality of electric storage devices aligned in a first direction; and a frame configured to hold the plurality of electric storage devices, the frame including a first frame element that is arranged so as to face the plurality of electric storage devices from one side in a second direction orthogonal to the first direction and to directly or indirectly abut the plurality of electric storage devices and a second frame element that is arranged so as to face the plurality of electric storage devices from the other side in the second direction (for example, see JP 2011-023302 A).

SUMMARY

Meanwhile, in the electric storage apparatus as mentioned above, gaps may possibly occur between the first frame element and the electric storage devices or between the second frame element and the electric storage devices due to effects of the action of external force such as deformation. In such a state, the electric storage devices unintentionally move between the first frame element and the second frame element, which may result in problems such as variation in the positions of the electric storage devices between the first frame element and the second frame element, and application of load to members connected to the electric storage devices.

In view of such an actual situation, it is an object of the present invention to provide an electric storage apparatus capable of preventing the movement of electric storage devices between a first frame element and a second frame element.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An electric storage apparatus of the present invention includes: a plurality of electric storage devices aligned in a first direction; and a frame configured to hold the plurality of electric storage devices, the frame including: a first frame element that is arranged so as to face the plurality of electric storage devices from one side in a second direction orthogonal to the first direction and to directly or indirectly abut the plurality of electric storage devices; and a second frame element that is arranged so as to face the plurality of electric storage devices from the other side in the second direction, wherein the second frame element includes, between the second frame element and the plurality of electric storage devices, a holding part having projections that are respectively in contact with the plurality of electric storage devices.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
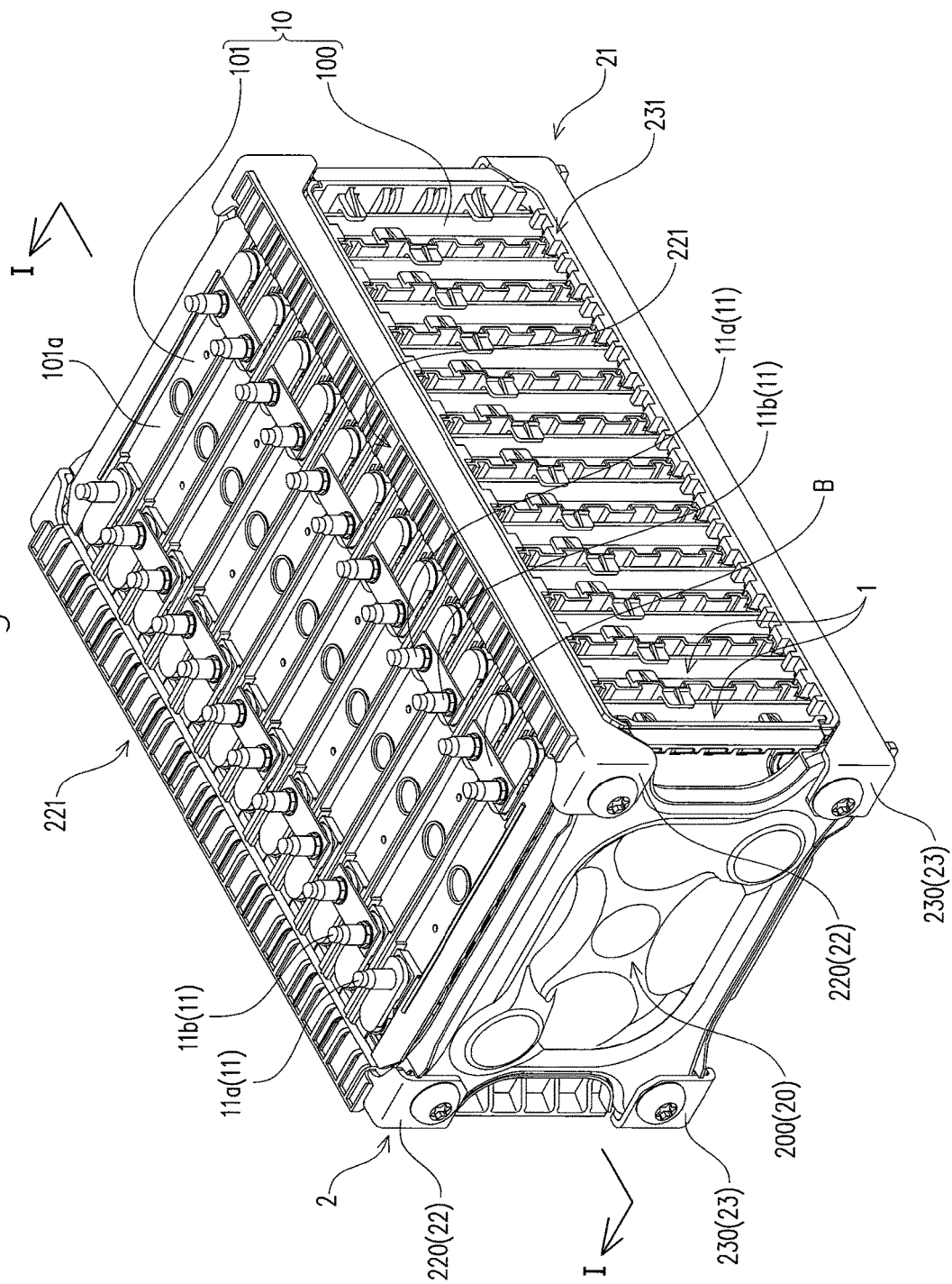
FIG. 1 is a perspective view of an electric storage apparatus according to an embodiment of the present invention.

An electric storage apparatus according to this embodiment includes: a plurality of electric storage devices aligned in a first direction; and a frame configured to hold the plurality of electric storage devices, the frame including: a first frame element that is arranged so as to face the plurality of electric storage devices from one side in a second direction orthogonal to the first direction and to directly or indirectly abut the plurality of electric storage devices; and a second frame element that is arranged so as to face the plurality of electric storage devices from the other side in the second direction, wherein the second frame element includes, between the second frame element and the plurality of electric storage devices, a holding part having projections that are respectively in contact with the plurality of electric storage devices.

According to the electric storage apparatus configured as above, the second frame element includes, between the second frame element and the plurality of electric storage devices, the holding part having projections that are respectively in contact with the plurality of electric storage devices. Therefore, the plurality of electric storage devices receive the force acting toward the first frame element side respectively from the projections.

In this way, it is possible to prevent gaps from occurring between the first frame element and the electric storage devices or between the second frame element and the electric storage devices by interposing the holding part having the projections between the second frame element and the electric storage devices.

According to one aspect of the electric storage apparatus of this embodiment, it is preferable that: the plurality of electric storage devices include a first electric storage device and a second electric storage device that has a larger dimension in the second direction than the first electric storage device, and the projections that are in contact with the second electric storage device have a smaller height in the second direction than the projections that are in contact with the first electric storage device.

This allows the projections having a smaller height in the second direction to be in contact with the second electric storage device having a larger dimension in the second direction than the first electric storage device. This can eliminate the positional difference in the second direction between the first electric storage device and the second electric storage device. As a result, the positions in the second direction of the reference surfaces of the plurality of electric storage devices can be aligned.

According to another aspect of the electric storage apparatus according to this embodiment, the projections may be deformable.

In this case, the projections deform when being pressed toward the second frame element side by the electric storage devices. Accordingly, the electric storage devices can be prevented from receiving excessive force acting toward the first frame element side from the projections.

According to another aspect of the electric storage apparatus according to this embodiment, the projections may be elastically deformable.

In this case, the projections elastically deform when being pressed toward the second frame element side by the electric storage devices. Thus, the projections press the electric storage devices toward the first frame element side by the elastic force. Accordingly, the electric storage devices can be pressed toward the first frame element side by appropriate force, while the electric storage devices are prevented from receiving excessive force acting toward the first frame element side from the projections.

According to still another aspect, the electric storage apparatus according to this embodiment may have a configuration in which: the plurality of electric storage devices respectively have reference surfaces in the second direction, and the first frame element directly or indirectly abuts the reference surfaces.

In this way, the positions in the second direction of the reference surfaces of the plurality of electric storage devices can be aligned. Accordingly, the positions of the plurality of electric storage devices in the second direction can be aligned.

According to still another aspect, the electric storage apparatus according to this embodiment may have a configuration in which: the plurality of electric storage devices respectively have external terminals on the reference surfaces, and the external terminals of each two adjacent electric storage devices are connected to each other by a bus bar.

In this way, the positions in the second direction of the reference surfaces of the plurality of electric storage devices can be aligned, thereby allowing the positions in the second direction the external terminals of the reference surfaces of the plurality of electric storage devices to be aligned, as well. Accordingly, it is possible to prevent application of load to the bus bar connecting the external terminals of the adjacent electric storage devices to each other due to the positional difference in the second direction between the external terminals of the plurality of electric storage devices.

According to still another aspect, the electric storage apparatus according to this embodiment may have a configuration in which: the plurality of electric storage devices respectively have external terminals, the external terminals of each two adjacent electric storage devices are connected to each other by a bus bar, the external terminals are connected to the bus bar by welding, and the reference surfaces are welding surfaces between the bus bar and the respective external terminals.

In this way, the positions in the second direction of the reference surfaces of the plurality of electric storage devices can be aligned, thereby allowing the welding surfaces between the bus bar and the respective external terminals of the plurality of electric storage devices to be aligned on the same plane. Thus, the lifting of the bus bar from the welding surfaces can be suppressed.

According to still another aspect, the electric storage apparatus according to this embodiment may have a configuration in which: the frame includes: a pair of end members that are arranged on both sides in the first direction of the plurality of electric storage devices so as to sandwich the plurality of electric storage devices; and a coupling member configured to couple the pair of end members to each other so as to integrally secure the plurality of electric storage devices, wherein the first frame element and the second frame element constitute a part or the whole of the coupling member.

In this way, the pair of end members sandwiching the plurality of electric storage devices are coupled to each other by the coupling member, thereby allowing compressive force in the first direction to act on the plurality of electric storage devices. Therefore, the plurality of electric storage devices can be prevented from moving between the first frame element and the second frame element more reliably.

According to still another aspect, the electric storage apparatus according to this embodiment may have a configuration in which: pairs of the projections are provided at intervals from each other so as to correspond respectively to the plurality of electric storage devices.

In this way, gaps are respectively formed between the pairs of the projections. Accordingly, air can be circulated through the gaps, so that the electric storage devices can be maintained at an appropriate temperature.

According to still another aspect, the electric storage apparatus according to this embodiment may have a configuration in which: the holding part is an insulating member configured to insulate the plurality of electric storage devices from the second frame element.

In this way, the electric storage devices can be insulated by the holding part.

As described above, the electric storage apparatus according to this embodiment can exert an excellent effect of preventing the electric storage devices from moving between the first frame element and the second frame element.

Hereinafter, an electric storage apparatus according to an embodiment of the present invention is described with reference to the attached drawings. As shown in FIG. 1, the electric storage apparatus of this embodiment includes a plurality of electric storage devices 1 aligned in a first direction and a frame 2 configured to hold the plurality of electric storage devices 1.

The electric storage devices 1 are each a rectangular battery cell flattened in the first direction. More specifically, each of the electric storage devices 1 includes a case 10 composed of a case body 100 that has an opening and a cover plate 101 that closes and seals the opening of the case body 100. The case body 100 houses an electrode assembly (not shown in the figure) including a positive electrode plate and a negative electrode plate insulated from each other. Further, the electric storage device 1 has a reference surface 101a extending in a third direction orthogonal to a second direction, which is orthogonal to the first direction. In this embodiment, the outer surface of the cover plate 101 constitutes the reference surface 101a.

Further, the electric storage device 1 has a pair of positive and negative external terminals 11a and 11b on the reference surface 101a. Each two adjacent electric storage devices 1 are arranged so that the polarities of the external terminals 11a and 11b are opposite to each other, and the external terminals 11a and 11b of the adjacent electric storage devices 1 are electrically connected to each other by a bus bar B having conductivity. This allows the plurality of electric storage devices 1 to be electrically connected to each other so as to constitute a battery.

Figure 2:
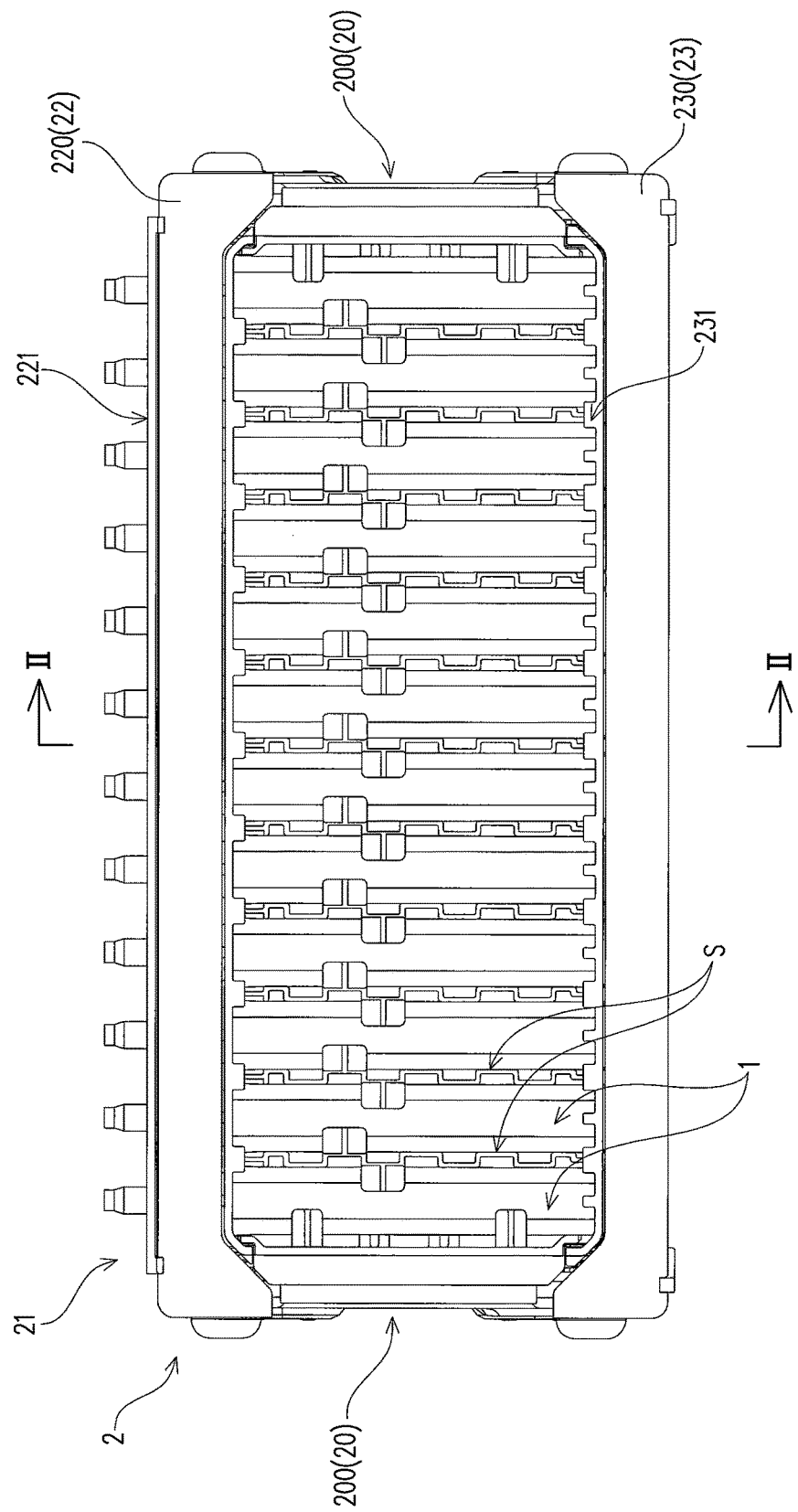
FIG. 2 is a side view of the electric storage apparatus according to the aforementioned embodiment.
Figure 3:
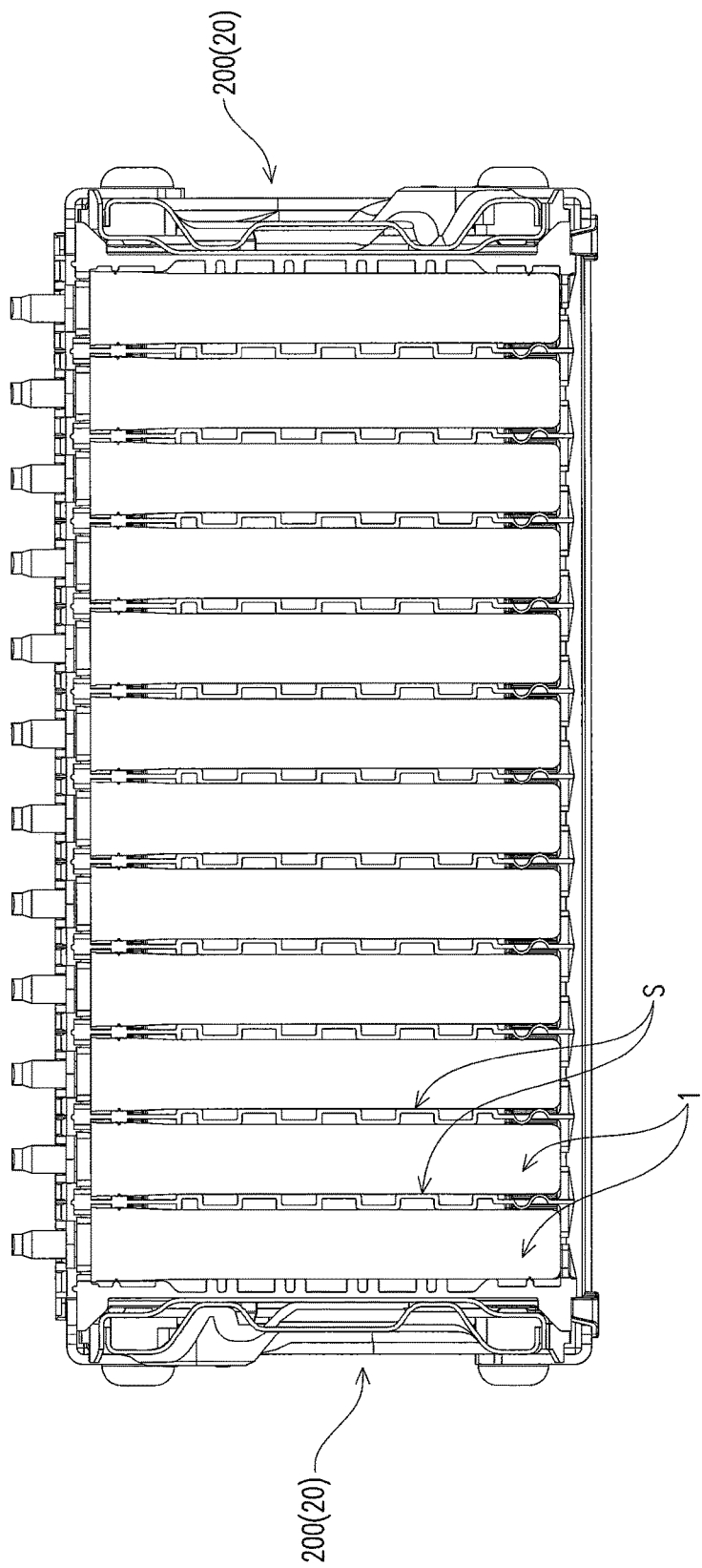
FIG. 3 is a sectional view, taken along the line I-I in FIG. 1, of the electric storage apparatus according to the aforementioned embodiment.

As shown in FIG. 2 and FIG. 3, a spacer S is arranged between each two adjacent electric storage devices 1. Therefore, the plurality of electric storage devices 1 are arranged at equal intervals.

As shown in FIG. 1 and FIG. 2, the frame 2 includes a pair of end members 20 that are arranged on both sides in the first direction of the plurality of electric storage devices 1 so as to sandwich the plurality of electric storage devices 1, and a coupling member 21 that couples the pair of end members 20 to each other so as to integrally secure the plurality of electric storage devices 1.

The end members 20 each have an end member body 200 arranged at a position corresponding to the case body 100 of the electric storage device 1.

The coupling member 21 includes a first frame element 22 that is arranged so as to face the plurality of electric storage devices 1 from one side in the second direction orthogonal to the first direction and to directly or indirectly abut the plurality of electric storage devices 1, and a second frame element 23 that is arranged so as to face the plurality of electric storage devices 1 from the other side in the second direction. That is, the first frame element 22 and the second frame element 23 constitute the whole of the coupling member 21.

Figure 4:
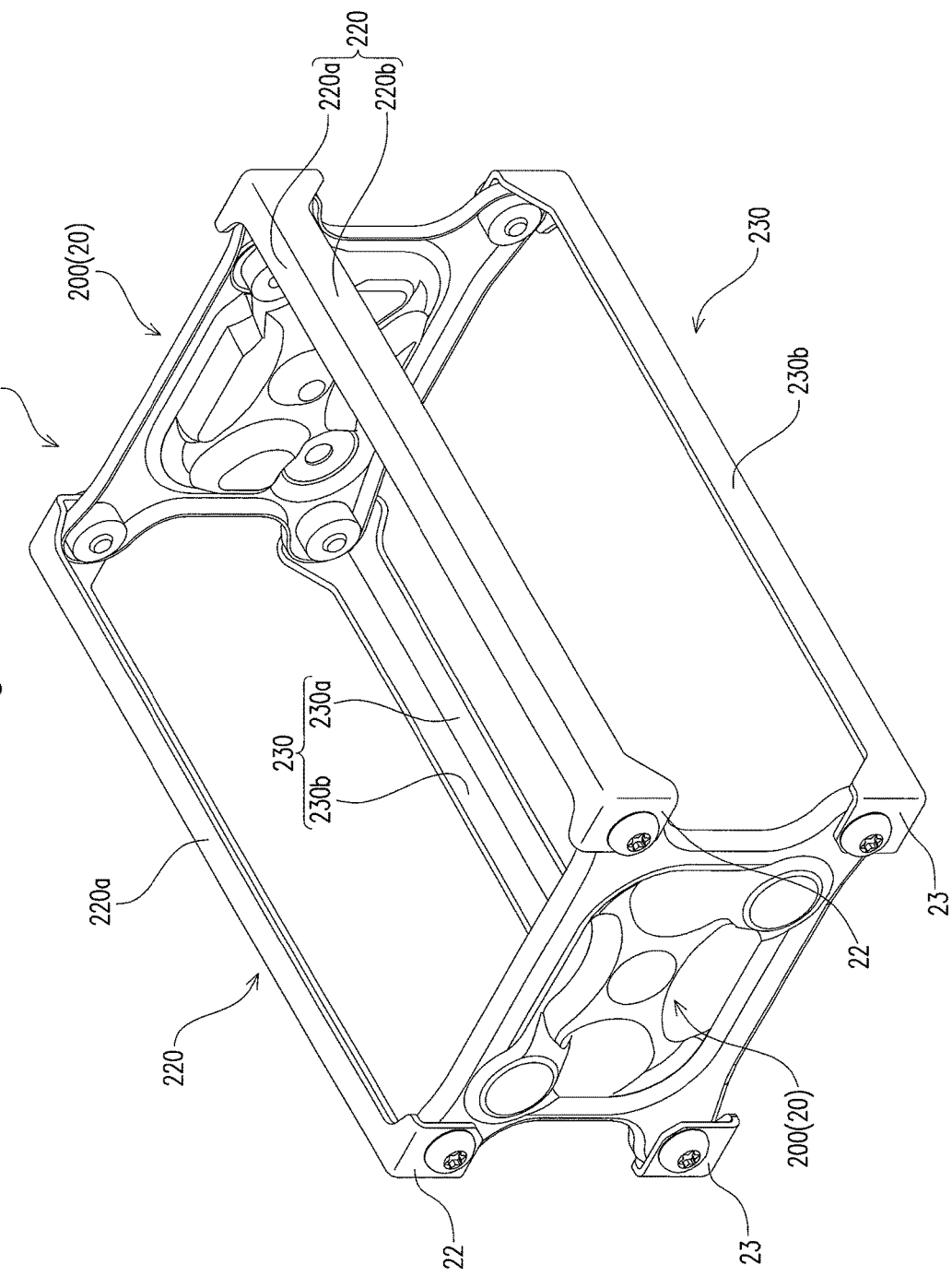
FIG. 4 is a perspective view of a frame of the electric storage apparatus according to the aforementioned embodiment.

As shown in FIG. 4, the first frame element 22 includes a pair of first beam members 220 that are elongated in the first direction. Further, as shown in FIG. 1 and FIG. 2, the first frame element 22 includes an abutting member 221 arranged between each of the first beam members 220 and the plurality of electric storage devices 1.

Each of the pair of first beam members 220 is formed to be bent at its center in the second direction serving as a boundary. Further, the first beam member 220 has a first end in the first direction and a second end opposite to the first end. The first end of the first beam member 220 is coupled to one of the end members 20, and the second end of the first beam member 220 is coupled to the other of the end members 20. The portion on one side bounded by the center in the second direction of the first beam member 220 is referred to as an upper plate 220a, and the portion on the other side bounded by the center in the second direction of the first beam member 220 is referred to as a side plate 220b, in the following descriptions.

The pair of first beam members 220 are arranged at an interval from each other in a third direction that is orthogonal to the first direction and the second direction, and are each coupled to the pair of end members 20. Thus, the pair of first beam members 220 each have the side plate 220b arranged outwardly of the side surfaces of the plurality of electric storage devices 1 in the third direction (surfaces on both sides in the third direction of the electric storage device 1).

Further, the pair of first beam members 220 each have the upper plate 220a arranged outwardly of (above) the reference surfaces 101a of the plurality of electric storage devices 1 in the first direction. Therefore, the first frame element 22 is configured to indirectly abut the reference surfaces 101a of the electric storage devices 1.

More specifically, each of the upper plates 220a of the first frame element 22 is configured to abut the reference surfaces 101a of the electric storage devices 1 via the abutting member 221 (the upper surface 221a and pressed members 221c of the abutting members 221, which will be described below).

As described above, the first frame element 22 includes the pair of first beam members 220. Therefore, the first frame element 22 includes two abutting members 221. The pair of the abutting members 221 each have insulating properties.

Figure 5:
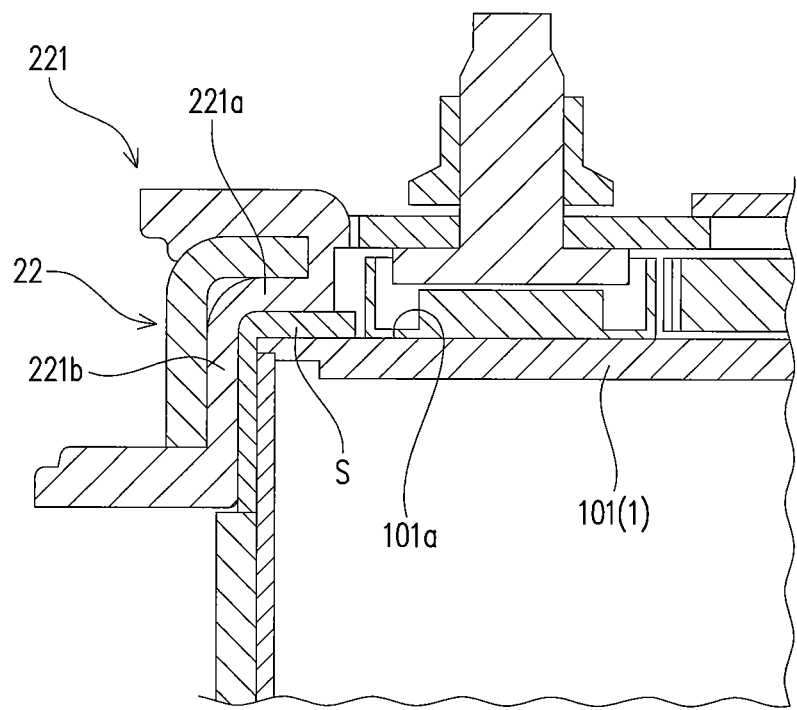
FIG. 5 is an enlarged sectional view of a part in the vicinity of a first frame element of the electric storage apparatus according to the aforementioned embodiment.
Figure 9:
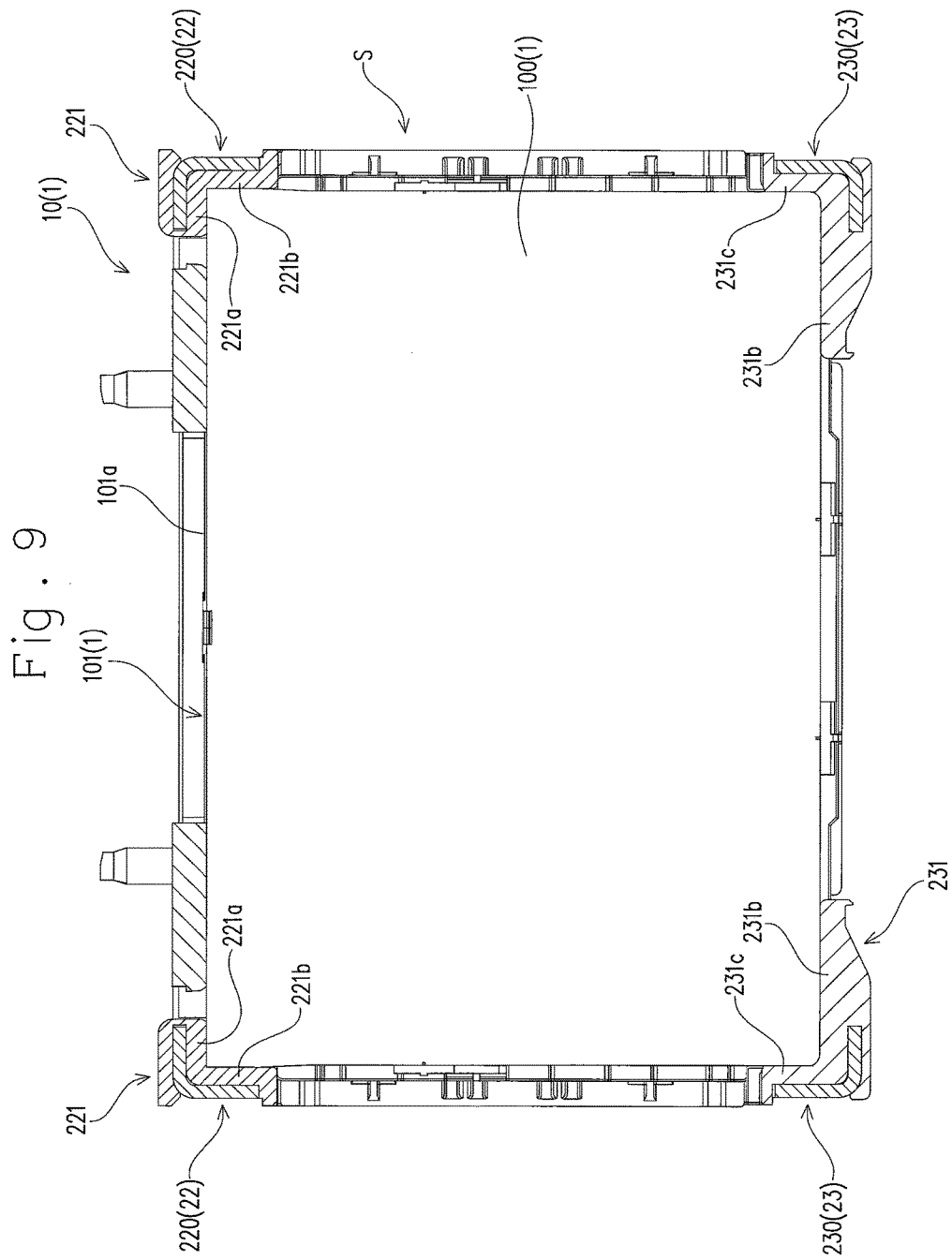
FIG. 9 is a sectional view, taken along the line II-II in FIG. 2, of the electric storage apparatus according to the aforementioned embodiment.

As shown in FIG. 5 and FIG. 9, each of the abutting members 221 is configured to indirectly abut the reference surfaces 101a (the cover plates 101) of the electric storage devices 1. More specifically, the abutting member 221 is configured to abut the reference surfaces 101a (the cover plates 101) of the electric storage devices 1 via parts of the spacers S.

Figure 6:
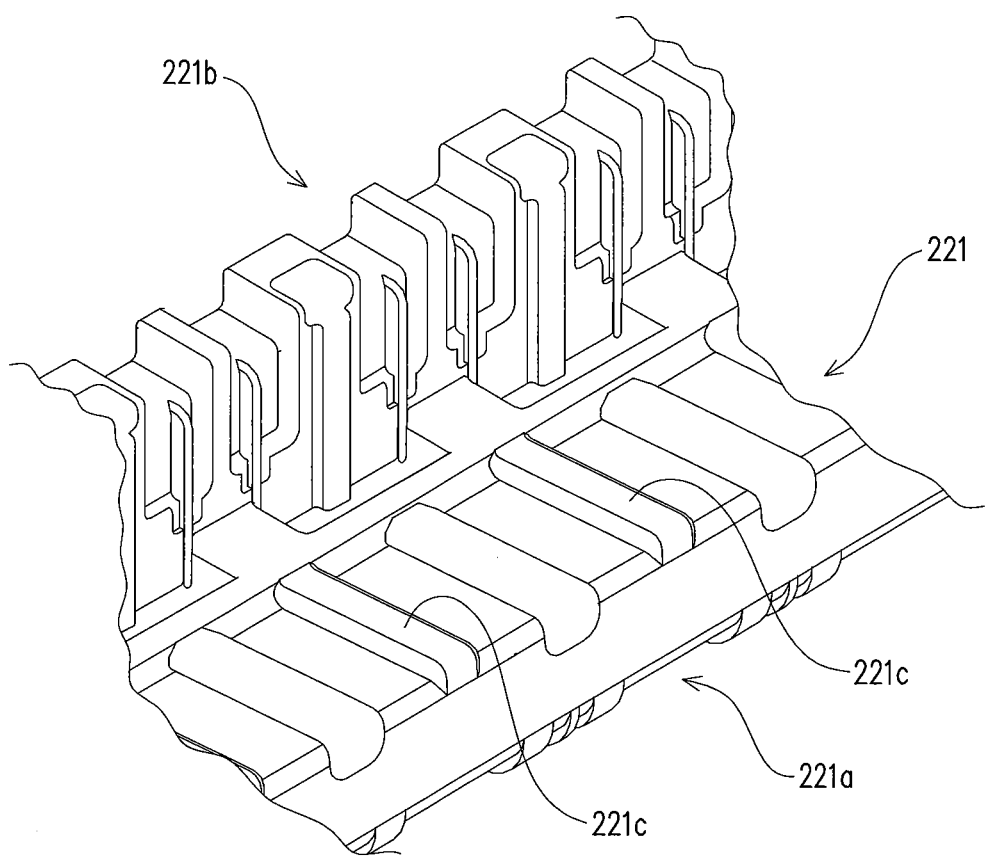
FIG. 6 is a perspective view of an abutting member of the electric storage apparatus according to the aforementioned embodiment.

Each of the pair of abutting members 221 has an upper part 221a that faces the reference surfaces 101a of the electric storage devices 1 and a side part 221b that faces the side surfaces of the electric storage devices 1. As shown in FIG. 6, each of the pair of abutting members 221 further has a plurality of pressed members 221c projecting in the second direction from the upper part 221a.

The pressed members 221c are provided to correspond one-to-one to the plurality of electric storage devices 1. Further, the pressed members 221c are formed to be elongated in the second direction. The pressed members 221c are configured to abut the reference surfaces 101a of the electric storage devices 1.

As shown in FIG. 4, the second frame element 23 includes a pair of second beam members 230 elongated in the second direction. As shown in FIG. 1 and FIG. 2, the second frame element 23 further includes a holding part 231 having projections 231a that are provided between the second frame element 23 and the plurality of electric storage devices 1 so as to be in contact with the plurality of electric storage devices 1.

Each of the pair of second beam members 230 is formed to be bent at its center in the second direction serving as a boundary. Further, the second beam member 230 has a first end in the first direction and a second end opposite to the first end. The first end of the second beam member 230 is coupled to one of the end members 20, and the second end of the second beam member 230 is coupled to the other of the end members 20. The portion on one side bounded by the center in the second direction of the second beam member 230 is referred to as a bottom plate 230a, and the portion on the other side bounded by the center in the second direction of the second beam member 230 is referred to as a side plate 230b, in the following descriptions.

The pair of second beam members 230 are arranged at an interval from each other in the third direction, and are each coupled to the pair of end members 20. Thus, the pair of second beam members 230 each have the side plate 230b arranged outwardly of the side surfaces of the plurality of electric storage devices 1 in the third direction. Further, the pair of second beam members 230 each have the bottom plate 230a arranged outwardly of the bottom surfaces (surfaces opposite to the reference surfaces 101a) of the plurality of electric storage devices 1 in the first direction.

Figure 7:
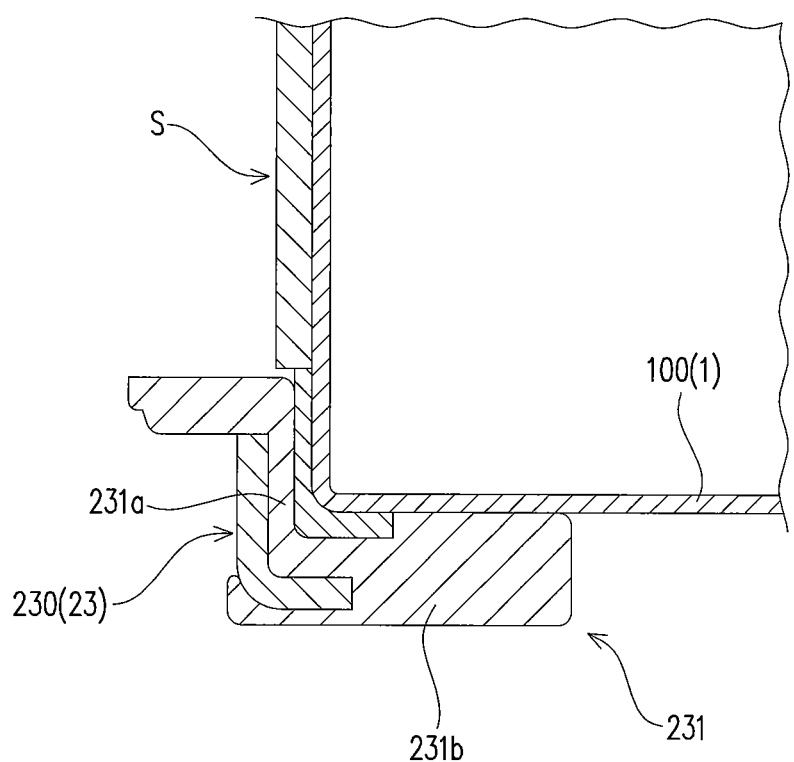
FIG. 7 is an enlarged sectional view of a part in the vicinity of a second frame element of the electric storage apparatus according to the aforementioned embodiment.
Figure 8:
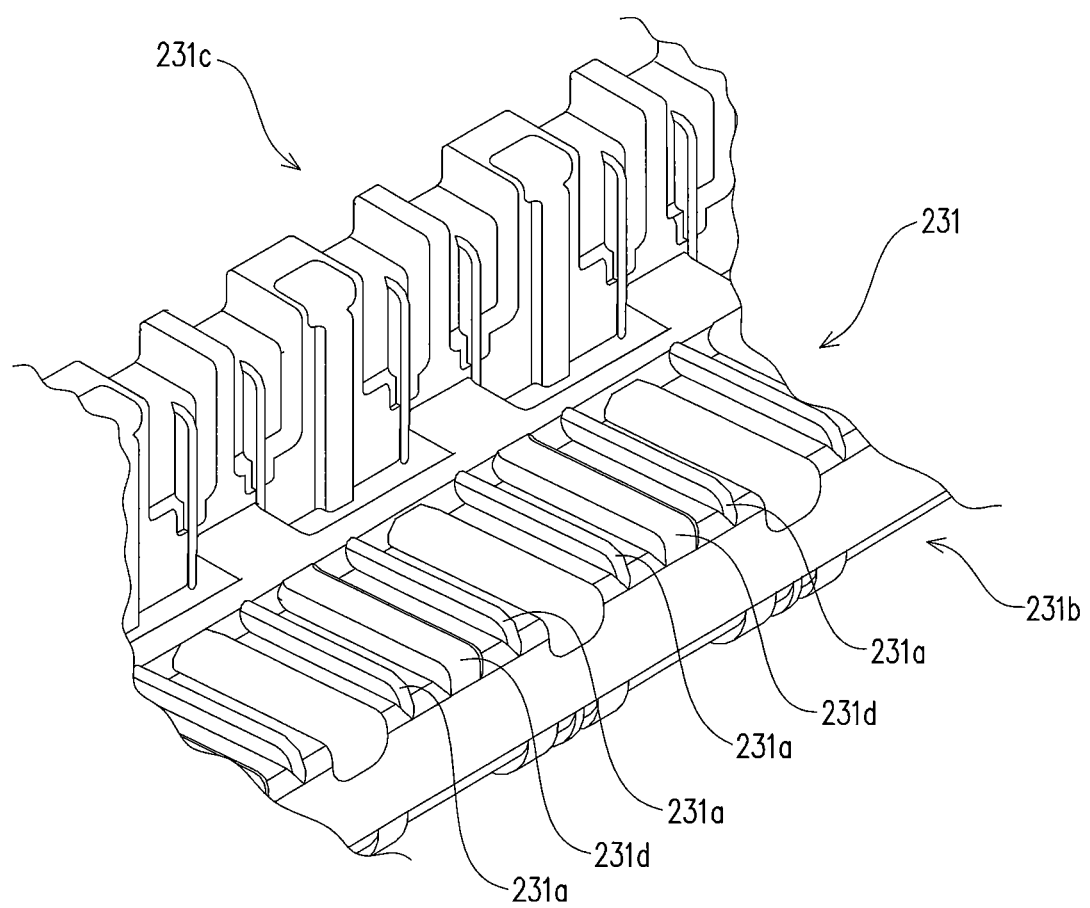
FIG. 8 is a perspective view of a holding part of the electric storage apparatus according to the aforementioned embodiment.

As described above, the second frame element 23 includes the pair of second beam members 230. Therefore, the second frame element 23 includes two holding parts 231. As shown in FIG. 7 and FIG. 8, each of the holding parts 231 includes the plurality of projections 231a. As shown in FIG. 7 and FIG. 9, the holding part 231, which is arranged between each of the second beam members 230 and the electric storage devices 1, further has a bottom part 231b that faces the bottom surfaces of the electric storage devices 1 and a side part 231c that faces the side surfaces of the electric storage devices 1. As shown in FIG. 8, the holding part 231 has a mounting part 231d extending in the third direction from the bottom part 231b.

Pairs of the plurality of projections 231a are provided at intervals from each other so as to correspond respectively to the plurality of electric storage devices 1. Further, the projections 231a are elongated in the third direction.

The mounting part 231d is provided between each pair of the projections 231a. Further, the dimension in the second direction of the mounting part 231d is smaller than the dimensions in the second direction of the projections 231a. That is, in the holding part 231, the dimensions of the projections 231a in the second direction are larger than the dimension of the mounting part 231d in the second direction.

The electric storage apparatus according to this embodiment is as described above. Subsequently, the mechanism for preventing the electric storage devices 1 from moving between the first frame element 22 and the second frame element 23 is described with reference to the attached drawings.

First, in order to assemble the electric storage apparatus, the plurality of electric storage devices 1 are sandwiched by the pair of end members 20. In this embodiment, spacers S arranged respectively between the electric storage devices 1 are sandwiched together with the plurality of electric storage devices 1 by the pair of end members 20. This allows compressive force in the first direction to act on the plurality of electric storage devices 1.

Then, while the plurality of electric storage devices 1 are sandwiched by the pair of end members 20, the coupling member 21 (the first frame element 22 and the second frame element 23) is coupled to the end members 20.

Figure 10:
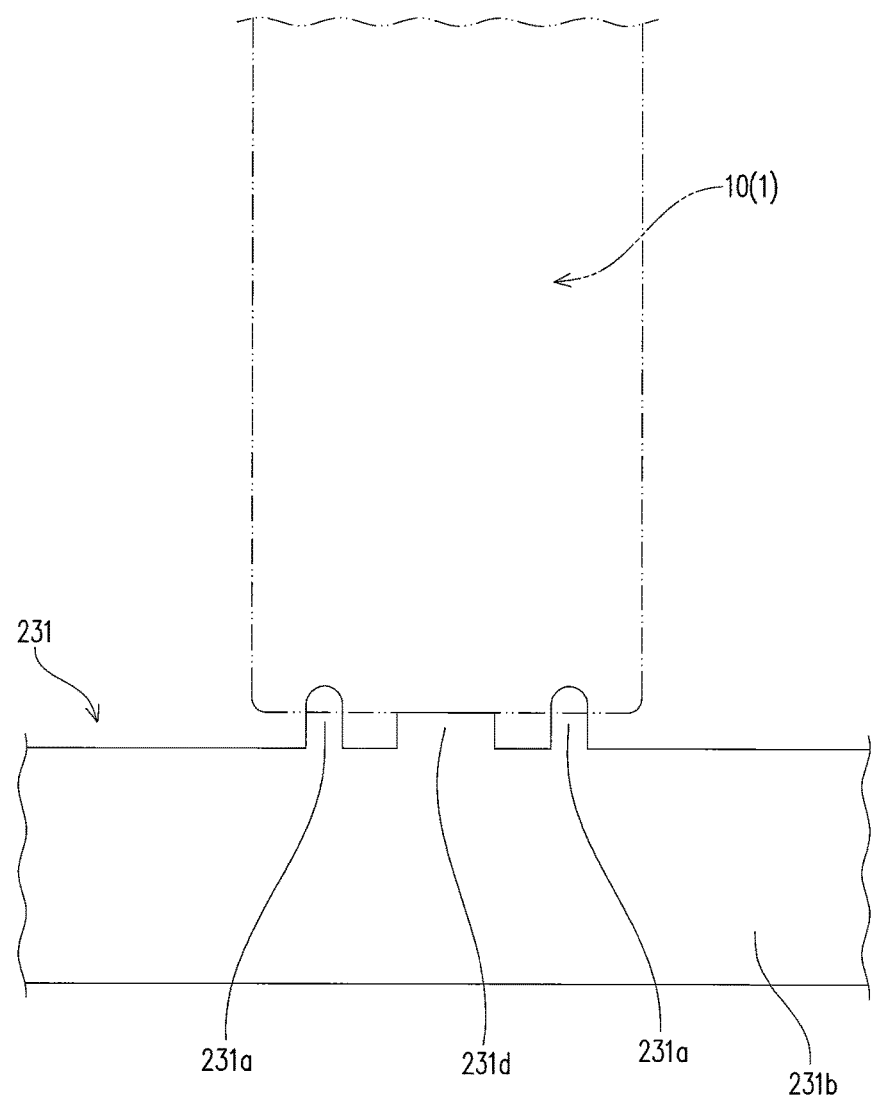
FIG. 10 is an explanatory diagram illustrating the electric storage apparatus according to the aforementioned embodiment with its electric storage devices not abutting the holding part.
Figure 11:
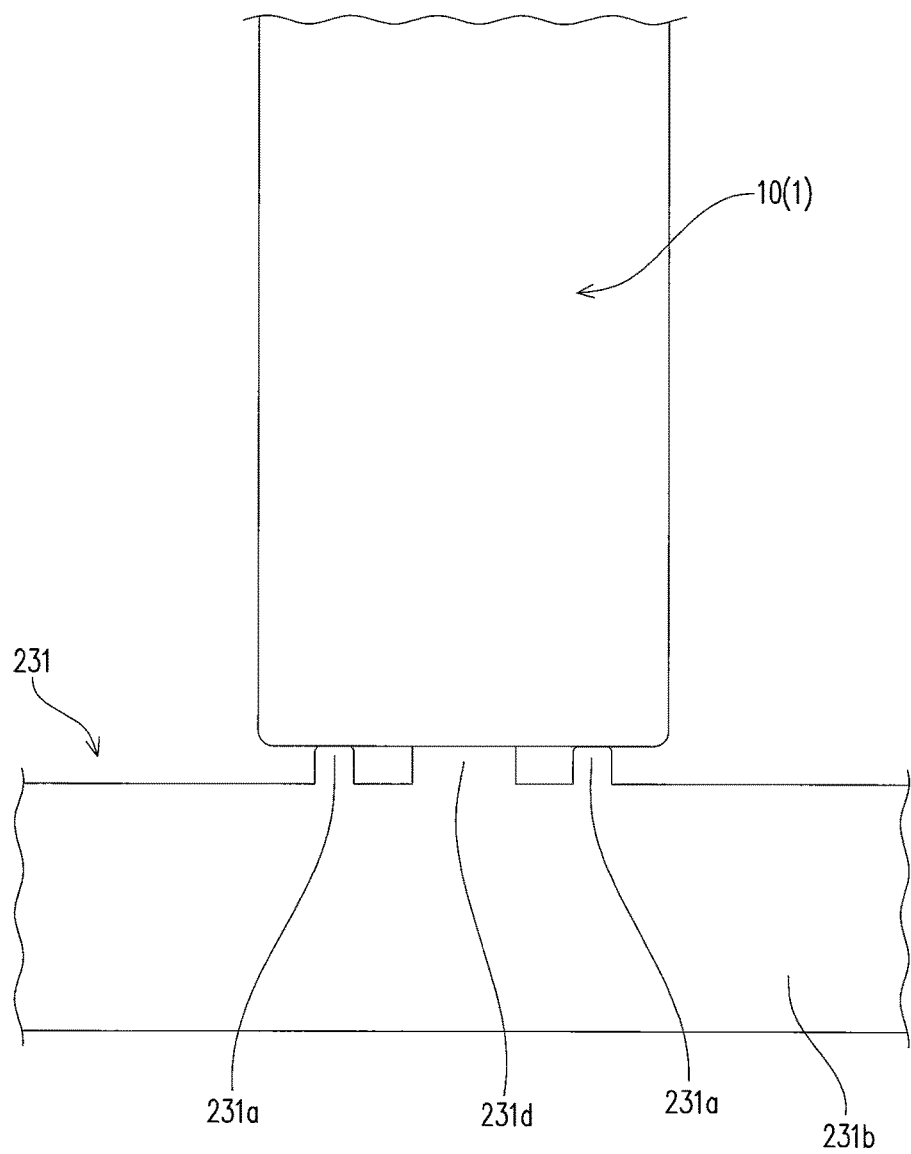
FIG. 11 is an explanatory diagram illustrating the electric storage apparatus according to the aforementioned embodiment with its electric storage devices abutting the holding part.

At this time, the holding part 231 of the second frame element 23 is sandwiched by each of the second beam members 230 and the electric storage devices 1 (the bottom surfaces of the electric storage devices 1). As shown in FIG. 10, the dimensions of the projections 231a in the second direction are larger than the dimension of the mounting part 231d in the second direction. Therefore, when the second frame element 23 is coupled to the end members 20, as shown in FIG. 1, the projections 231a are pressed by the bottom surface of each of the electric storage devices 1, as shown in FIG. 11, and further the bottom surface of the electric storage device 1 abuts the mounting part 231d.

At this instance, the projections 231a elastically deform. Therefore, the elastic force of the projections 231a acts on the electric storage device 1. Thus, the projections 231a press each electric storage device 1 toward the first frame element 22 side in the electric storage apparatus.

This causes the reference surfaces 101a of the electric storage devices 1 (the cover plates 101) to be pressed against the pressed members 221c of the abutting members 221 via the spacers S. Then, the reference surfaces 101a of the electric storage devices 1 are sandwiched by the first frame element 22 (the pressed members 221c) and the second frame element 23 (the projections 231a).

As described above, the electric storage apparatus according to this embodiment can prevent gaps from occurring between the first frame element 22 and the electric storage devices 1 and between the second frame element 23 and the electric storage devices 1 by interposing the holding parts 231 having the projections 231a between the second frame element 23 and the electric storage devices 1. Accordingly, it can exert an excellent effect of preventing the electric storage devices 1 from moving between the first frame element 22 and the second frame element 23.

Further, the projections 231a are configured to press the electric storage devices 1 toward the first frame element 22 side by the elastic force. Therefore, the electric storage devices 1 can be prevented from receiving excessive force acting toward the first frame element 22 side from the projections 231a. Further, the electric storage devices 1 can be pressed toward the first frame element 22 side by appropriate force.

Furthermore, the plurality of electric storage devices 1 respectively have the reference surfaces 101a in the second direction, and the first frame element 22 indirectly abut the reference surfaces 101a. Therefore, the positions in the second direction of the reference surfaces 101a of the plurality of electric storage devices 1 can be aligned. Accordingly, the positions in the second direction of the plurality of electric storage devices 1 can be aligned.

Further, the plurality of electric storage devices 1 each have external terminals 11 on the reference surface 101a, and the external terminals 11 of each two adjacent electric storage devices 1 are connected to each other by the bus bar B, whereby the position in the second direction of the external terminals 11 of the plurality of electric storage devices 1 can be aligned by aligning the positions in the second direction of the reference surfaces 101a of the plurality of electric storage devices 1. Accordingly, it is possible to prevent application of load to the bus bar B connecting the external terminals 11 of the adjacent electric storage devices 1 to each other due to the positional difference in the second direction between the external terminals 11 of the plurality of electric storage devices 1.

Further, the frame 2 includes the pair of end members 20 that are arranged on both sides in the first direction of the plurality of electric storage devices 1 so as to sandwich the plurality of electric storage devices 1, and the coupling member 21 that couples the pair of end members 20 to each other so as to integrally secure the plurality of electric storage devices 1. Therefore, the pair of end members 20 sandwiching the plurality of electric storage devices 1 are coupled by the coupling member 21 to each other, thereby allowing compressive force in the first direction to act on the plurality of electric storage devices 1. Accordingly, the plurality of electric storage devices 1 can be prevented from moving between the first frame element 22 and the second frame element 23 more reliably.

Further, pairs of the projections 231*a* are provided at intervals from each other so as to correspond respectively to the plurality of electric storage devices 1. Therefore, gaps are respectively formed between the pairs of projections 231*a*. Accordingly, air can be circulated through the gaps, so that the electric storage devices 1 can be maintained at an appropriate temperature, or condensation on the electric storage devices 1 can be prevented.

Further, the holding parts 231 are insulating members configured to insulate the plurality of electric storage devices 1 from the second frame element 23. Therefore, the holding parts 231 can insulate the electric storage devices 1.

It is a matter of course that the electric storage apparatus according to the present invention is not limited to the above described embodiments, and various modifications can be made without departing from the scope of the present invention.

In the above described embodiments, the abutting members 221 are configured to indirectly abut the reference surfaces 101*a* of the plurality of electric storage devices 1. However, there is no limitation to this. For example, the abutting members 221 may directly abut the reference surfaces 101*a* of the plurality of electric storage devices 1.

Further, in the above described embodiments, the first frame element 22 and the second frame element 23 constitute the whole of the coupling member 21. However, there is no limitation to this. For example, the first frame element 22 and the second frame element 23 may constitute a part of the coupling member 21. That is, the coupling member may include constitutional elements other than the first frame element 22 and the second frame element 23.

Further, though not particularly mentioned in the above described embodiments, the abutting members 221 may be deformable or elastically deformable.

Further, in the above described embodiments, the second frame element 23 includes the second beam members 230 and the holding parts 231 as separate bodies. However, there is no limitation to this. For example, the second beam members 230 and the holding parts 231 may be integrally formed.

Further, in the above described embodiments, the holding parts 231 have the pairs of projections 231*a*. However, there is no limitation to this. For example, one projection 231*a* may be provided, or three or more projections 231*a* may be provided.

Further, in the above described embodiments, the projections 231*a* of the holding parts 231 are elastically deformable. However, there is no limitation to this. For example, the projections 231*a* may be simply deformable.

In the above described embodiments, the plurality of projections 231*a* that are respectively in contact with the plurality of electric storage devices 1 all have the same height. However, there is no limitation to this. For example, the plurality of projections 231*a* that are respectively in contact with the plurality of electric storage devices 1 may each have a different height.

Figure 12:
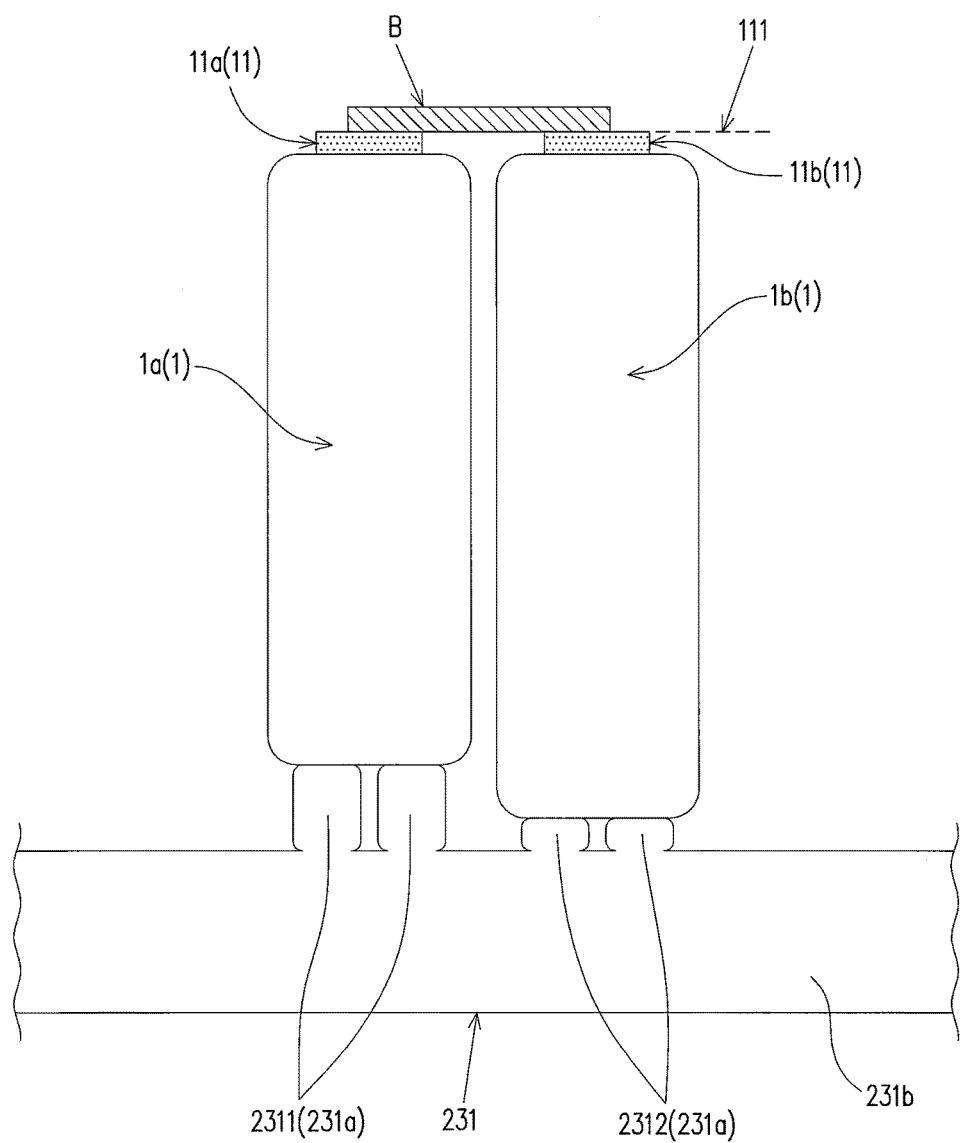
FIG. 12 is an explanatory diagram illustrating an electric storage apparatus according to another embodiment in which external terminals of each two adjacent electric storage devices are connected by a bus bar.

At least one of the plurality of electric storage devices 1 may have a dimension in the second direction that is different from others. In this case, the plurality of electric storage devices 1 include a first electric storage device 1*a* and a second electric storage device 1*b* that has a larger dimension in the second direction than the first electric storage device 1*a*, as shown in FIG. 12. Therefore, as shown in FIG. 12, projections 2312 that are in contact with the second electric storage device 1*b* are set to have a smaller height in the second direction than projections 2311 that are in contact with the first electric storage device 1*a*. This allows the second electric storage device 1*b* having a larger dimension in the second direction than the first electric storage device 1*a* to be in contact with the projections 2312 having a smaller height in the second direction. Therefore, the positional difference in the second direction between the first electric storage device 1*a* and the second electric storage device 1*b* can be eliminated. As a result, the positions in the second direction of the reference surfaces of the plurality of electric storage devices 1 can be aligned.

Further, in the above described embodiments, the outer surfaces of the cover plates 101 constitute the reference surfaces 101*a*. However, there is no limitation to this. For example, the outer surfaces of the external terminals 11*a* and 11*b* may constitute the reference surfaces.

Specifically, as shown in FIG. 12, in the case of the external terminals 11*a* and 11*b* each having a flat plate shape, the outer surfaces of the flat plates of the external terminals 11*a* and 11*b* may constitute reference surfaces 111. It is preferable that the external terminals 11*a* and 11*b* be connected to the bus bar B by welding. In this case, the welding surfaces between the bus bar B and the external terminals 11*a* and 11*b* serve as the reference surfaces 111.

For example, a relative difference between the positions in the second direction of the flat plates of the external terminals 11*a* and 11*b* of the plurality of electric storage devices 1 may cause the bus bar B to lift up from the welding surfaces, when the external terminals 11*a* and 11*b* are connected to the bus bar B by welding.

Then, when the welding surfaces between the bus bar B and the external terminals 11*a* and 11*b* are set as the reference surfaces 111, the positions in the second direction of the reference surfaces 111 of the plurality of electric storage devices 1 can be aligned. This allows the welding surfaces between the bus bar B and the external terminals 11*a* and 11*b* of the plurality of electric storage devices 1 to be aligned on the same plane. As a result, the lifting of the bus bar B from the welding surfaces can be suppressed. Therefore, the degree of tightness between the bus bar B and the external terminals 11*a* and 11*b* is made uniform in the plurality of electric storage devices 1, which can effectively suppress welding failure. Further, for example, when the electric storage apparatus is subjected to vibration, uneven distribution of the force acting in a direction in which the bus bar B and the external terminals 11*a* and 11*b* move away from each other on either one of adjacent electric storage devices 1 can be suppressed. As a result, an increase in contact resistance due to deterioration in the contact state between the bus bar B and the external terminals 11*a* and 11*b* can be effectively suppressed, thereby allowing the performance of the electric storage apparatus to be effectively maintained.

The electric storage apparatus of this embodiment is as described above. However, the present invention is not limited to the above described embodiments, and the design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An electric storage apparatus, comprising:
a plurality of electric storage devices aligned in a first direction; and
a frame configured to hold the plurality of electric storage devices,
the frame comprising:
a first frame element that is arranged so as to face the plurality of electric storage devices from one side in a second direction orthogonal to the first direction and to directly or indirectly abut the plurality of electric storage devices; and
a second frame element that is arranged so as to face the plurality of electric storage devices from an other side in the second direction,
wherein the second frame element comprises, between the second frame element and the plurality of electric storage devices, a holding part including projections that are respectively in contact with the plurality of electric storage devices,
wherein each of the projections extends in a third direction between the second frame element and the plurality of electric storage devices, the third direction being orthogonal to the first direction and the second direction, and
wherein each of the plurality of electric storage devices includes external terminals, the external terminals of said each of the plurality of electric storage devices being arranged along the third direction.

2. The electric storage apparatus according to claim 1, wherein the plurality of electric storage devices include a first electric storage device and a second electric storage device that has a larger dimension in the second direction than the first electric storage device, and
wherein the projections that are in contact with the second electric storage device have a smaller height in the second direction than the projections that are in contact with the first electric storage device.

3. The electric storage apparatus according to claim 1, wherein the projections are deformable.

4. The electric storage apparatus according to claim 1, wherein the projections are elastically deformable.

5. The electric storage apparatus according to claim 1, wherein the plurality of electric storage devices respectively include reference surfaces in the second direction, and
wherein the first frame element directly or indirectly abuts the reference surfaces.

6. The electric storage apparatus according to claim 5, wherein the plurality of electric storage devices respectively include the external terminals on the reference surfaces, and
wherein the external terminals of each two adjacent electric storage devices are connected to each other by a bus bar.

7. The electric storage apparatus according to claim 5, wherein the plurality of electric storage devices respectively include the external terminals,
wherein the external terminals of each two adjacent electric storage devices are connected to each other by a bus bar,
wherein the external terminals are connected to the bus bar by welding, and
wherein the reference surfaces are welding surfaces between the bus bar and the respective external terminals.

8. The electric storage apparatus according to claim 1, wherein the frame further comprises:
a pair of end members that are arranged on both sides in the first direction of the plurality of electric storage devices so as to sandwich the plurality of electric storage devices; and
a coupling member configured to couple the pair of end members to each other so as to integrally secure the plurality of electric storage devices, and
wherein the first frame element and the second frame element constitute a part or a whole of the coupling member.

9. The electric storage apparatus according to claim 1, wherein pairs of the projections are provided at intervals from each other so as to correspond respectively to the plurality of electric storage devices.

10. The electric storage apparatus according to claim 1, wherein the holding part comprises an insulating member configured to insulate the plurality of electric storage devices from the second frame element.

11. The electric storage apparatus according to claim 1, wherein said each of the projections longitudinally extends in the third direction orthogonal to an extension direction of the external terminals from upper surfaces of the plurality of electric storage devices.

12. The electric storage apparatus according to claim 11, wherein the holding part includes:
a bottom part that faces bottom surfaces of the plurality of electric storage devices; and
a side part that faces side surfaces of the plurality of electric storage devices that extend between the bottom surfaces and the upper surfaces of the plurality of electric storage devices.

13. The electric storage apparatus according to claim 12, wherein the holding part further includes mounting parts provided between each pair of the projections, the mounting parts longitudinally extending in the third direction from the bottom part to abut the bottom surfaces of the electric storage devices.

14. The electric storage apparatus according to claim 13, wherein, in the holding part, a height of said each pair of the projections in the second direction is more than a height of the mounting parts in the second direction.

15. The electric storage apparatus according to claim 1, wherein said one side and said other side are positioned in the second direction on opposing sides of a face of the electric storage apparatus that covers the plurality of electric storage devices in the first direction and the second direction.

16. An electric storage apparatus, comprising:
a plurality of electric storage devices aligned in a first direction;
a frame configured to hold the plurality of electric storage devices, the frame comprising:
a first frame element longitudinally extending in the first direction to abut the plurality of electric storage devices; and
a second frame element longitudinally extending in the first direction, the first frame element and the second frame element being positioned in a second direction, orthogonal to the first direction, on opposing sides of a face of the electric storage apparatus that covers the plurality of electric storage devices in the first direction and the second direction; and a holding part including projections that are respectively in contact with the plurality of electric storage devices, wherein each of the projections extends in a third direction between the second frame element and the plurality of electric storage devices, the third direction being orthogonal to the first direction and the second direction, and wherein each of the plurality of electric storage devices includes external terminals, the external terminals of said each of the plurality of electric storage devices being arranged along the third direction.

17. The electric storage apparatus according to claim 16, wherein said each of the projections longitudinally extends in the third direction orthogonal to an extension direction of the external terminals from upper surfaces of the plurality of electric storage devices.

18. The electric storage apparatus according to claim 17, wherein the holding part includes:

a bottom part that faces bottom surfaces of the plurality of electric storage devices; and a side part that faces side surfaces of the plurality of electric storage devices that extend between the bottom surfaces and the upper surfaces of the plurality of electric storage devices.

19. The electric storage apparatus according to claim 18, wherein the holding part further includes mounting parts provided between each pair of the projections, the mounting parts longitudinally extending in the third direction from the bottom part to abut the bottom surfaces of the electric storage devices, and wherein, in the holding part, a height of said each pair of the projections in the second direction is more than a height of the mounting parts in the second direction.

20. An electric storage apparatus, comprising:

a plurality of electric storage devices aligned in a first direction; and a frame configured to hold the plurality of electric storage devices, the frame comprising:

a first frame element that is arranged so as to face the plurality of electric storage devices from one side in a second direction orthogonal to the first direction and to directly or indirectly abut the plurality of electric storage devices;

a second frame element that is arranged so as to face the plurality of electric storage devices from an other side in the second direction; and a holding part including projections that are respectively in contact with the plurality of electric storage devices, between the second frame element and the plurality of electric storage devices, wherein each of the projections extends in a third direction between the second frame element and the plurality of electric storage devices, the third direction being orthogonal to the first direction and the second direction, and wherein the holding part is disposed on the second frame element facing the plurality of electric storage devices in the third direction.

* * * * *